(12) United States Patent
Yin et al.

(10) Patent No.: US 9,106,129 B2
(45) Date of Patent: Aug. 11, 2015

(54) SELF-DRIVEN SYNCHRONOUS RECTIFIER DRIVE CIRCUIT, METHOD OF OPERATION THEREOF AND POWER CONVERTER INCORPORATING THE SAME

(75) Inventors: Lanlan Yin, Shanghai (CN); Xiaojian Zhao, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/404,760

(22) Filed: Feb. 24, 2012

(65) Prior Publication Data

US 2013/0094251 A1   Apr. 18, 2013

(30) Foreign Application Priority Data

Oct. 13, 2011   (CN) .......................... 2011 1 0308786

(51) Int. Cl.
*H02M 3/335* (2006.01)
*H02M 1/08* (2006.01)

(52) U.S. Cl.
CPC ............ *H02M 1/08* (2013.01); *H02M 3/33592* (2013.01); *Y02B 70/1475* (2013.01)

(58) Field of Classification Search
USPC .......................... 363/20, 21.06, 21.01–21.04
See application file for complete search history.

(56) References Cited

U.S. PATENT DOCUMENTS

| | | | |
|---|---|---|---|
| 6,256,214 B1 * | 7/2001 | Farrington et al. ........... 363/127 |
| 6,452,818 B1 | 9/2002 | Simopoulos | |
| 6,462,963 B1 | 10/2002 | Wittenbreder | |
| 6,597,587 B1 | 7/2003 | Poon et al. | |
| 7,016,203 B2 | 3/2006 | Xu et al. | |
| 7,203,041 B2 | 4/2007 | Williams et al. | |
| 7,333,350 B2 | 2/2008 | Williams et al. | |
| 7,362,598 B2 | 4/2008 | Schaible et al. | |
| 7,375,988 B2 | 5/2008 | Hensel | |
| 7,791,903 B2 | 9/2010 | Zhang et al. | |
| 7,885,086 B2 | 2/2011 | Wang et al. | |
| 2009/0066277 A1 * | 3/2009 | Ang et al. ................ 318/400.17 |
| 2011/0305043 A1 * | 12/2011 | Matsumoto ................ 363/21.01 |

FOREIGN PATENT DOCUMENTS

CN     101471609 A     7/2009
TW     546904 B        8/2003

OTHER PUBLICATIONS

Unofficial translation of Chinese Office Action and Search Report issued in connection with corresponding CN Application No. 201110308786.X dated Jul. 7, 2014.

* cited by examiner

*Primary Examiner* — Adolf Berhane
*Assistant Examiner* — Henry Lee, III
(74) *Attorney, Agent, or Firm* — General Electric Company

(57) ABSTRACT

A drive circuit for a synchronous rectifier, a method of driving a synchronous rectifier and a power converter incorporating the drive circuit or the method. In one embodiment, the drive circuit includes: (1) a first drive circuit stage configured to derive a timing for at least one drive signal from a secondary winding of a transformer coupled to the synchronous rectifier and (2) a second drive circuit stage, coupled to the first drive circuit stage and configured to employ a substantially stable voltage source to provide power for the at least one drive signal and apply the at least one drive signal to at least one control terminal of at least one synchronous rectifier switch in the synchronous rectifier.

20 Claims, 8 Drawing Sheets

SELF-DRIVEN SYNCHRONOUS RECTIFIER DRIVE CIRCUIT, METHOD OF OPERATION THEREOF AND POWER CONVERTER INCORPORATING THE SAME

CROSS REFERENCE RELATED APPLICATION

This application claims the benefit of, Chinese Application No. 201110308786.X filed on Oct. 13, 2011, entitled "SELF-DRIVEN SYNCHRONOUS RECTIFIER DRIVE CIRCUIT, METHOD OF OPERATION THEREOF AND POWER CONVERTER INCORPORATING THE SAME. The above application is commonly assigned with this application and is incorporated herein by reference in its entirety.

TECHNICAL FIELD

This application is directed, in general, to power converters and, more specifically, to a self-driven synchronous rectifier drive circuit, a method of operation thereof and a power converter incorporating the same.

BACKGROUND

Conventional self-driven synchronous rectifiers are not suitable for use in power converters designed to accommodate a relatively wide input voltage range (e.g., when the maximum input voltage is more than about three times the minimum input voltage). This is because the clamping voltage for the synchronous rectifier, which is derived from the transformer and designed to be barely sufficient when the input voltage is at the minimum, becomes exceedingly large when the input voltage lies in the upper part of the range. The resulting power dissipation and heat generation in the synchronous rectifier drive circuitry makes the power converter inefficient, difficult to cool and subject to failure.

One way to avoid the problem is avoid deriving the clamping voltage from the transformer. An alternative technique involves transferring a control signal from the primary side of the converter to the secondary side. Unfortunately, the control signal must not only be isolated, e.g., by a digital isolation circuit, but also must be delayed, e.g., with an RC delay circuit. The above-described efficiency, thermal and reliability issues are avoided, but the required control circuit is complex, making its layout and manufacturing cost impractical for many practical applications.

SUMMARY

One aspect provides a drive circuit for a synchronous rectifier. In one embodiment, the drive circuit includes: (1) a first drive circuit stage configured to derive a timing for at least one drive signal from a secondary winding of a transformer coupled to the synchronous rectifier and (2) a second drive circuit stage coupled to the first drive circuit stage and configured to employ a substantially stable voltage source to provide power for the at least one drive signal and apply the at least one drive signal to at least one control terminal of at least one synchronous rectifier switch in the synchronous rectifier.

Another aspect provides a method of driving a synchronous rectifier. In one embodiment, the method includes: (1) deriving a timing for at least one drive signal from a secondary winding of a transformer coupled to the synchronous rectifier with a first drive circuit stage, (2) employing a substantially stable voltage source to provide power for the at least one drive signal with a second drive circuit stage and (3) applying the at least one drive signal to at least one control terminal of at least one synchronous rectifier switch in the synchronous rectifier.

Yet another aspect provides a power converter. In one embodiment, the power converter includes: (1) a primary side including at least one primary side switch and configured to accommodate a maximum input voltage that is more than about three times a minimum input voltage, (2) a secondary side including a synchronous rectifier having at least one synchronous rectifier switch, (3) a transformer core coupling the primary side and the secondary side and (4) a drive circuit for the synchronous rectifier. In one embodiment, the drive circuit includes: (1) a first drive circuit stage configured to derive a timing for at least one drive signal from a secondary winding of the transformer and (2) a second drive circuit stage, coupled to the first drive circuit stage and configured to employ a substantially stable voltage source to provide power for the at least one drive signal and apply the at least one drive signal to at least one control terminal of the at least one synchronous rectifier switch.

BRIEF DESCRIPTION

Reference is now made to the following descriptions taken in conjunction with the accompanying drawings, in which.

DETAILED DESCRIPTION

As described above, self-driving synchronous rectifiers are not suitable for use in power converters designed to accommodate a relatively wide input voltage range, because the clamping voltage for the synchronous rectifier becomes exceedingly large when the input voltage lies in the upper part of the range. For example, given an input voltage range of 18-75V, a desired DC output voltage of 5V, a transformer having a 2:1 turns ratio, a 50 nC gate charge (Qg), a 400 kHz switching frequency, a gate-source voltage (Vgs) of 6.5V, and a 75V input voltage, the average voltage across each switch in the drive circuit of the synchronous rectifier is 29V, the average current through each switch in the drive circuit is 0.02 A, and the resulting power dissipated in each switch of the drive circuit is 0.58 W, which is too high for practical power converter applications.

Introduced herein are various embodiments of a drive circuit for a self-driven synchronous rectifier that yields reduced voltages in the drive circuit and accordingly reduces power dissipation and heat generation in the drive circuit and increases overall efficiency and reliability of the power converter. In general, the drive circuit employs a novel, two stage structure. The first stage is configured to provide the correct timing for at least one drive signal. The second stage is configured to employ a substantially stable voltage source to provide the power for the at least one drive signal. Use of the substantially stable voltage source allows the relatively large voltage variations inherent in a transformer-based voltage source to be avoided and therefore allows large power dissipations experienced at higher input voltages to be avoided. Use of the substantially stable power source also avoids the need to derive a signal from the primary side and therefore the resulting circuitry required to isolate and delay the signal. Consequently, various embodiments of the system and method yield a relatively simple, cost effective, and reliable solution allowing self-driven synchronous rectifiers to function efficiently in power converters designed to accommodate a wide input voltage range.

Figure 1:
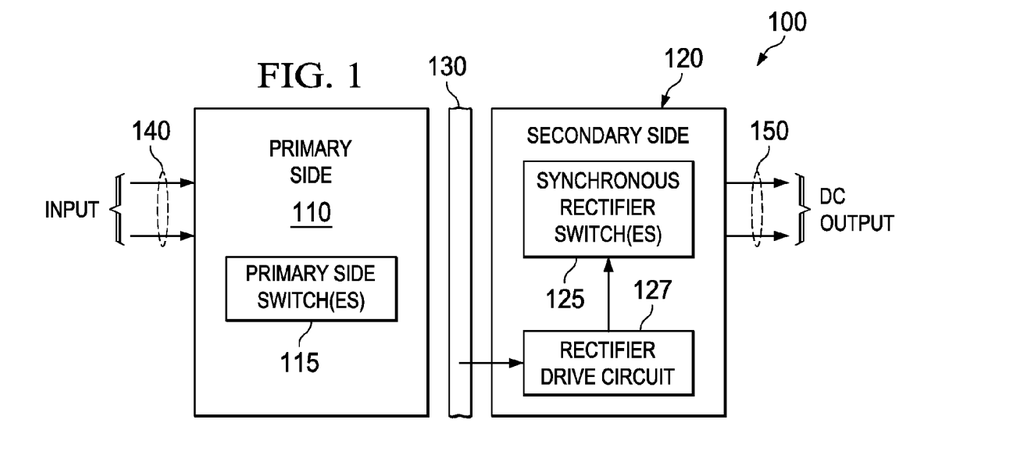
FIG. 1 is a block diagram of a power converter having a synchronous rectifier with which various embodiments of the drive circuit described herein may operate.

FIG. 1 is a block diagram of a power converter 100 having a synchronous rectifier with which various embodiments of the drive circuit described herein may operate. The power converter has a primary side 110 and a secondary side 120. A transformer having a core 130 isolates the primary and secondary sides 110, 120. The primary side 110 includes one or more primary side switches 115 configured to receive power at an input 140 and create a modulating magnetic field in and around the transformer core 130. The secondary side 120 includes one or more synchronous rectifier switches 125 and a rectifier drive circuit 127 configured to produce one or more drive signals that drive the one or more synchronous rectifier switches 125 such that they transfer and rectify power from the modulating magnetic field associated with the transformer core 130 and deliver it to a DC output 150. It is an objective to design the one or more drive signals such that the one or more synchronous rectifier switches 125 are driven efficiently and without undue stress. Various embodiments of the power converter 100 to be described include a forward converter and a push-push converter, although those skilled in the art will recognize that the drive circuit disclosed herein may be applied to other converter types or topologies without departing from the principles of the invention.

Figure 2:
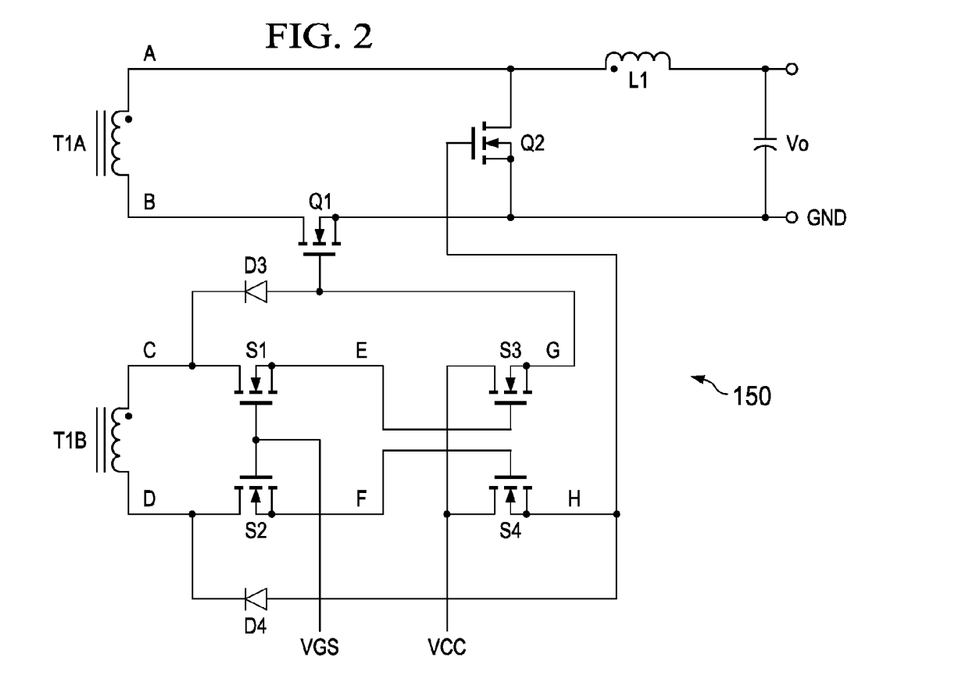
FIG. 2 is a schematic diagram of one embodiment of a synchronous rectifier drive circuit employed in a forward converter.

FIG. 2 is a schematic diagram of one embodiment of a synchronous rectifier drive circuit (e.g., the synchronous rectifier drive circuit 127 of FIG. 1) employed in a forward converter. A secondary power winding T1A is magnetically coupled to the converter's transformer core (not shown, but referenced as 130 in FIG. 1). A first synchronous rectifier switch Q1 is coupled between the secondary power winding T1A and the DC output 150 (also represented as an output voltage Vo across an unreferenced output capacitor). A second synchronous rectifier switch Q2 is coupled across the secondary power winding T1A and to the DC output 150. The first and second synchronous rectifier switches Q1, Q2 are configured to cooperate to rectify power received from the secondary power winding T1A. In the illustrated embodiment, the first and second synchronous rectifier switches Q1, Q2 are metal-oxide semiconductor field-effect transistors (MOSFETs). An output inductor L1 and the unreferenced output capacitor are configured to cooperate to smooth the rectified power to yield the output voltage Vo at the DC output 150.

A secondary auxiliary winding T1B is also magnetically coupled to the converter's transformer core (not shown, but referenced as 130 in FIG. 1). First, second, third and fourth drive circuit drive circuit switches S1, S2, S3, S4 are coupled to the secondary auxiliary winding T1B as shown in FIG. 2. In the illustrated embodiment, the first, second, third and fourth drive circuit drive circuit switches S1, S2, S3, S4 are MOSFETs. Control terminals (e.g., gates) of the first and second drive circuit drive circuit switches S1, S2 are coupled to Vgs, which is a substantially unstable voltage source. Control terminals (e.g., gates) of the third and fourth drive circuit drive circuit switches S3, S4 are coupled to a voltage source Vcc. The voltage source Vcc is a substantially stable voltage source. In the illustrated embodiment, the voltage source Vcc is employed to drive control circuitry (e.g., embodied in one or more integrated circuits, or ICs, associated with the power converter. Diodes D3 and D4 are coupled to the first, second, third and fourth drive circuit drive circuit switches S1, S2, S3, S4 and control terminals (e.g., gates) of the first and second synchronous rectifier switches Q1, Q2 as shown in FIG. 2. The diodes D3, D4 are coupled respectively to the sources of the first and third drive circuit switches S1, S3. Accordingly, the first, second, third and fourth drive circuit drive circuit switches S1, S2, S3, S4 and the diodes D3 and D4 constitute the drive circuit embodiment of FIG. 2, which provides two drive signals, one to each of the synchronous rectifier switches Q1, Q2.

In operation, the first and second drive circuit drive circuit switches S1, S2 constitute the first stage of the drive circuit. As such, the first and second drive circuit drive circuit switches S1, S2 are configured to provide the correct timing for the two drive signals the drive circuit embodiment of FIG. 2 produces. In the embodiment of FIG. 2, the first and second drive circuit drive circuit switches S1, S2 use Vgs as the source for the correct timing of the drive signals. The third and fourth drive circuit drive circuit switches S3, S4 constitute the second stage of the drive circuit. The third and fourth drive circuit drive circuit switches S3, S4 are configured to employ Vcc as a substantially stable voltage source to provide the power for the drive signal. The first and second drive circuit drive circuit switches S1, S2 are coupled to the control terminals of the third and fourth drive circuit drive circuit switches S3, S4 and are therefore configured to cause the third and fourth drive circuit drive circuit switches S3, S4 to switch the power provided by Vcc according to the correct timing. The drive signals produced by the switching of the third and fourth drive circuit drive circuit switches S3, S4 are then delivered to the control terminals of the first and second synchronous rectifier switches Q1, Q2.

In some embodiments, the drive circuit exhibits a dramatically reduced power loss that is on the order of ¼ the power loss of a conventional drive circuit. Table 1, below, sets forth efficiencies and a relative improvement, as a function of input voltage, of an example conventional power converter and a power converter employing one embodiment of the novel, two-stage drive circuit described herein:

TABLE 1

A Comparison of Conventional and Novel Drive Circuit Efficiencies

| Vin | Efficiency of a Conventional Drive Circuit | Efficiency of a Two-stage Drive Circuit | Efficiency Improvement |
|---|---|---|---|
| 36 V | 91.20% | 91.35% | 0.15% |
| 48 V | 91.29% | 91.51% | 0.22% |
| 75 V | 89.81% | 90.46% | 0.65% |

The diodes D3, D4 are configured to increase the respective rates at which the third and fourth drive circuit drive circuit switches S3, S4 discharge. The single switch employed in a conventional drive circuit has a body diode that assists the single switch in turning off when the winding voltage of the secondary auxiliary winding T1B goes to a low level. The diode D3, if present, performs the same general function with respect to the first and third drive circuit switches D1, D3. Likewise, the diode D$, if present, performs the same general function with respect to the second and fourth drive circuit switches D2, D4. However, some embodiments of the drive circuit omit the diodes D3, D4.

Figure 3:
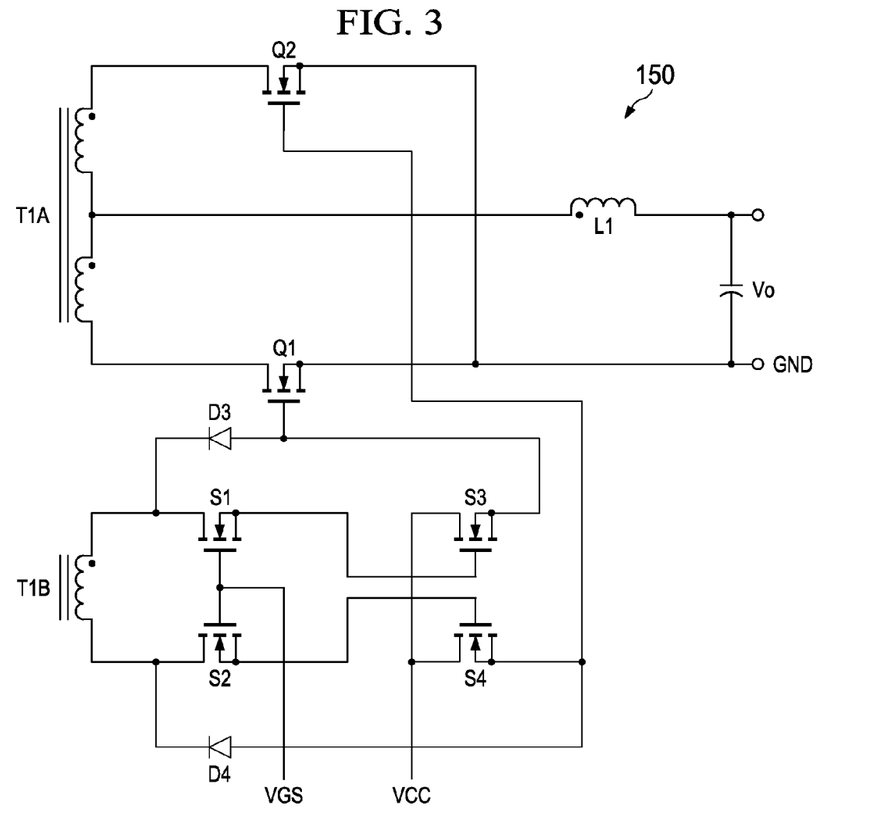
FIG. 3 is a schematic diagram of one embodiment of a synchronous rectifier drive circuit employed in a push-push converter.

FIG. 3 is a schematic diagram of one embodiment of a synchronous rectifier drive circuit employed in a push-push converter. A secondary power winding T1A is magnetically coupled to the converter's transformer core (not shown, but referenced as 130 in FIG. 1). A first synchronous rectifier switch Q1 is coupled between the secondary power winding T1A and the DC output 150 (also represented as an output voltage Vo across an unreferenced output capacitor). A second synchronous rectifier switch Q2 is coupled between the secondary power winding T1A and the DC output 150. The first and second synchronous rectifier switches Q1, Q2 are configured to cooperate to rectify power received from the secondary power winding T1A. In the illustrated embodiment, the first and second synchronous rectifier switches Q1, Q2 are metal-oxide semiconductor field-effect transistors (MOSFETs). An output inductor L1 is coupled to a center-tap of the secondary power winding T1A and the unreferenced output capacitor. Together, the output inductor L1 and the unreferenced output capacitor are configured to cooperate to smooth the rectified power to yield the output voltage Vo at the DC output 150.

As in FIG. 2, a secondary auxiliary winding T1B is also magnetically coupled to the converter's transformer core (not shown, but referenced as 130 in FIG. 1). First, second, third and fourth drive circuit drive circuit switches S1, S2, S3, S4 are coupled to the secondary auxiliary winding T1B as shown in FIG. 2. Gates of the first and second drive circuit drive circuit switches S1, S2 are coupled to Vgs. Gates of the third and fourth drive circuit drive circuit switches S3, S4 are coupled to Vcc. The diodes D3 and D4 are coupled to the first, second, third and fourth drive circuit drive circuit switches S1, S2, S3, S4 and gates of the first and second synchronous rectifier switches Q1, Q2. As in FIG. 2, the diodes D3, D4 are coupled respectively to the sources of the first and third drive circuit switches S1, S3. Accordingly, the first, second, third and fourth drive circuit switches S1, S2, S3, S4 and the diodes D3 and D4 constitute the drive circuit embodiment of FIG. 2, which provides two drive signals, one to each of the synchronous rectifier switches Q1, Q2. The drive circuit embodiment of FIG. 3 operates substantially like the drive circuit embodiment of FIG. 2.

Figure 4:
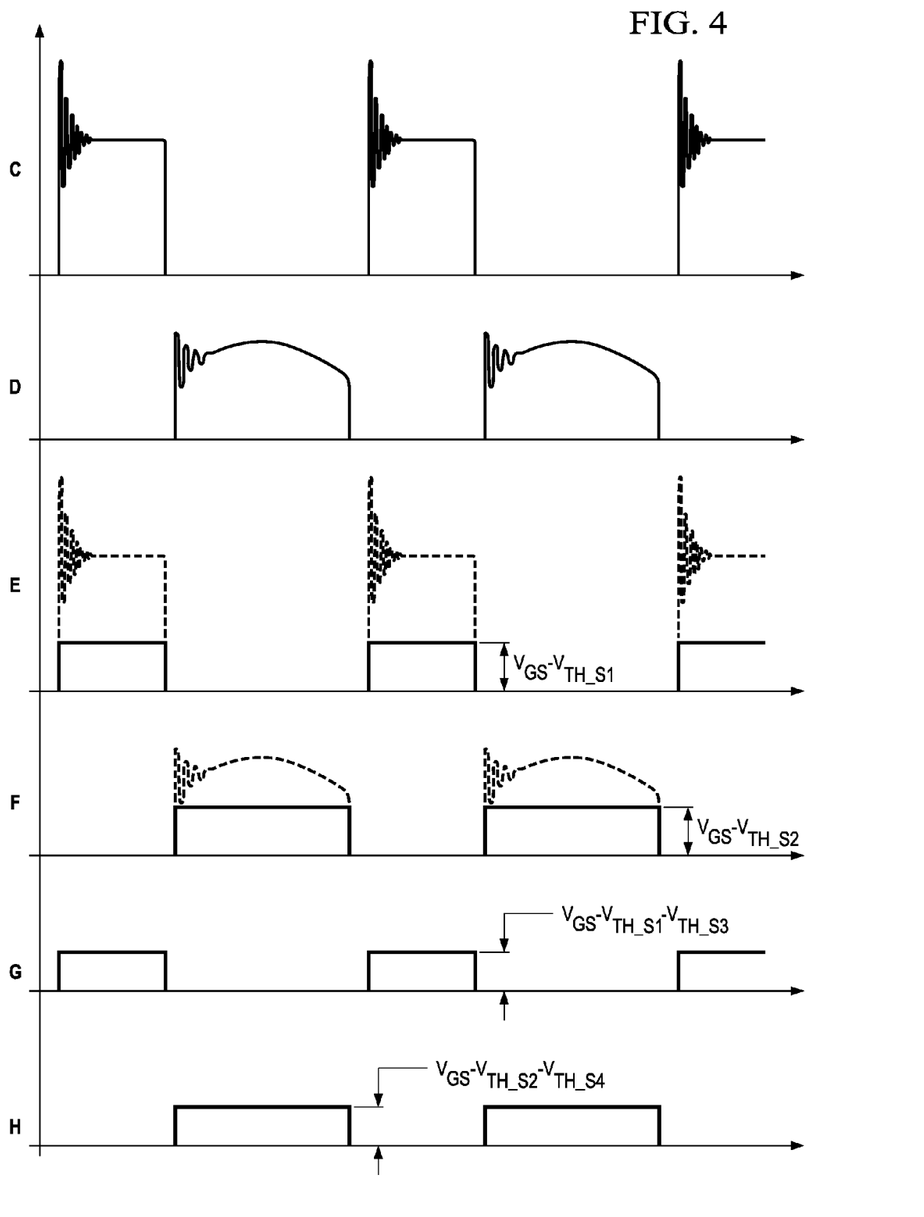
FIG. 4 is a timing diagram for a synchronous rectifier drive circuit described herein.

FIG. 2 shows several nodes, referenced as A, B, C, D, E, F, G, H. FIG. 4 is a timing diagram for one embodiment of the drive circuit, namely the drive circuit of FIG. 2, and sets forth examples of voltages at the nodes C, D, E, F, G, H.

When the voltage at the node A of FIG. 2 goes high, the first synchronous rectifier switch Q1 should be turned on. The voltage at the node C is in proportion to the voltage at the node A and so has the same phase with the driving signal of the first synchronous rectifier switch Q1. However, the voltage at node C changes as a function of the input voltage, so it is not sufficiently stable to provide a driving voltage for Q1. Therefore, the first drive circuit switch S1 is used to obtain the correct timing of the voltage at the node C. Accordingly, the voltage at the node E has the same voltage timing as the node C, but its voltage value is decreased to $V_{GS}-V_{TH\_S1}$, where $V_{TH\_S1}$ is the threshold voltage of the first drive circuit switch S1. In a conventional synchronous rectifier drive circuit, the voltage at the node E is used to drive the first synchronous rectifier switch Q1 directly. Instead, in the novel drive circuit, the voltage at the node E is used to drive the third drive circuit switch S3. Accordingly, the voltage at the node G has the same voltage timing as the nodes E and C, but its voltage value is less than that of the node E by the threshold voltage of the third drive circuit switch S3.

Since the substantially stable voltage Vcc is used to provide the power to drive the first synchronous rectifier switch Q1 and since Vcc is far lower than the voltage at the node E, the power dissipated in driving the first synchronous rectifier switch Q1 is less than the power a conventional drive circuit would dissipate. Further, while the driving current flowing through the third drive circuit switch S3 also flows through the first drive circuit switch S1, some power is dissipated in the first drive circuit switch S1. However, because the first drive circuit switch S1 is sized to switch signals and not power, its gate charge Qg is far lower than that of the first synchronous rectifier switch Q1. Therefore, although the voltage difference of across the first drive circuit switch S1 is high, it is multiplied by a relatively small driving current, the net effect is that the overall power dissipation of the drive circuit is greatly reduced compared to a conventional drive circuit.

Likewise, when the voltage at the node B of FIG. 2 goes high, the second synchronous rectifier switch Q2 should be turned on. The voltage at the node D is in proportion to the voltage at the node B and so has the same phase with the driving signal of the second synchronous rectifier switch Q2. However, the voltage at node D changes as a function of the input voltage, so it is not sufficiently stable to provide a driving voltage for Q2. Therefore, the second drive circuit switch S2 is used to obtain the correct timing of the voltage at the node D. Accordingly, the voltage at the node F has the same voltage timing as the node D, but its voltage value is decreased to $V_{GS}-V_{TH\_S2}$, where $V_{TH\_S2}$ is the threshold voltage of the second drive circuit switch S2. In a conventional synchronous rectifier drive circuit, the voltage at the node F is used to drive the second synchronous rectifier switch Q2 directly. Instead, in the novel drive circuit, the voltage at the node F is used to drive the fourth drive circuit switch S4. Accordingly, the voltage at the node H has the same voltage timing as the nodes F and D, but its voltage value is less than that of the node F by the threshold voltage of the fourth drive circuit switch S4.

The same power dissipation analysis discussed above with respect to the first and third drive circuit switches S1, S3 applies to the second and fourth drive circuit switches S2, S4.

Some embodiments of the drive circuit disclosed herein operate without a secondary auxiliary winding T1B. For example, a power converter having a particular input voltage range and output voltage (e.g., a 36-75V input range and a 3.3V DC output voltage), may not require a secondary auxiliary winding T1B. Instead, the secondary power winding T1A can be used.

Figure 5:
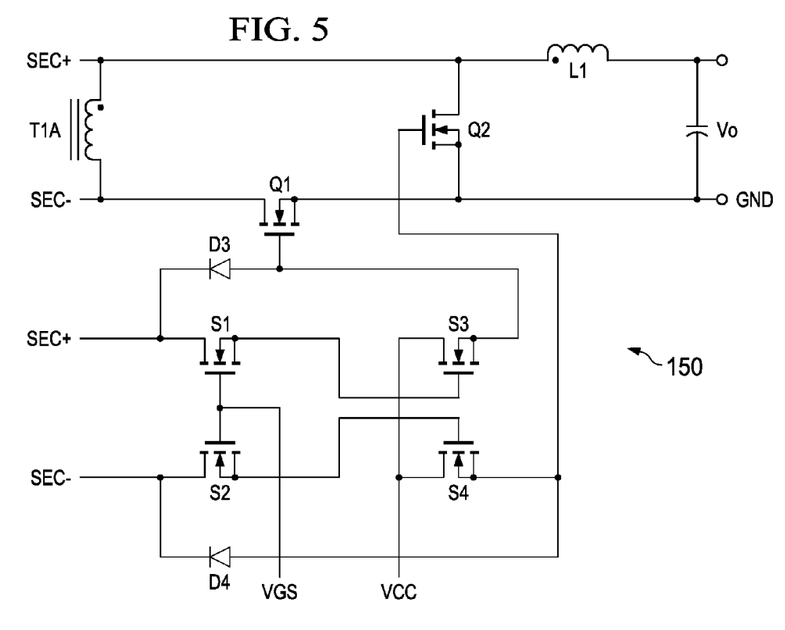
FIG. 5 is a schematic diagram of one embodiment of a synchronous rectifier drive circuit employed in a forward converter and driven by an secondary power winding thereof.
Figure 6:
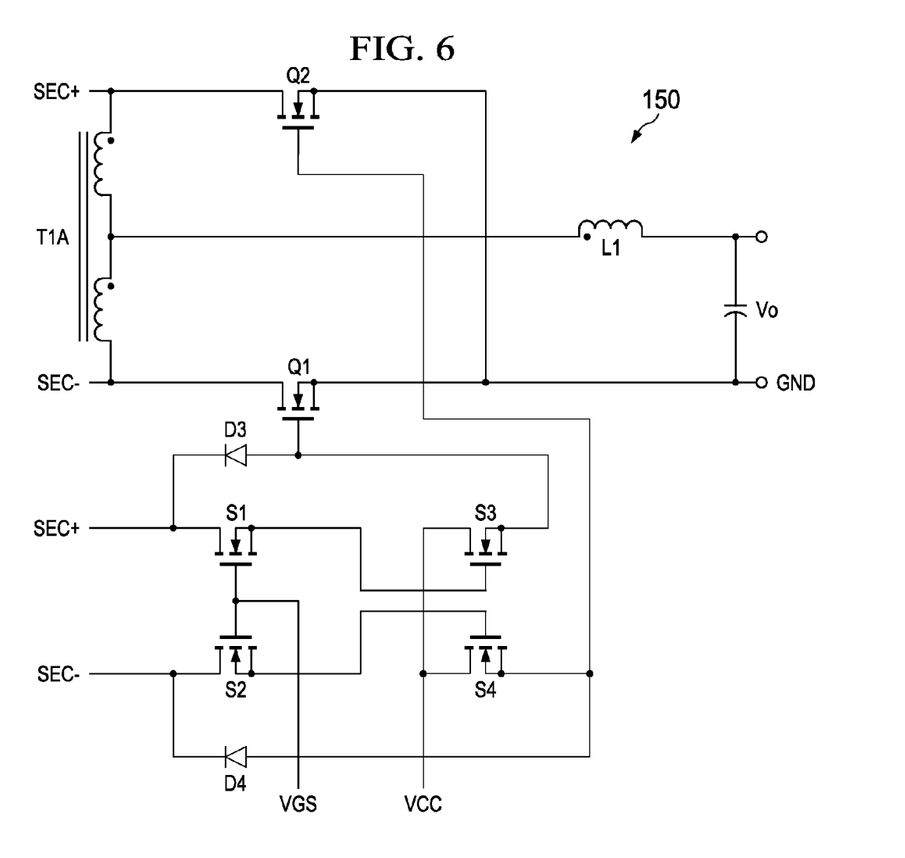
FIG. 6 is a schematic diagram of one embodiment of a synchronous rectifier drive circuit employed in a push-push converter and driven by a secondary power winding thereof.

FIG. 5 is a schematic diagram of one embodiment of a synchronous rectifier drive circuit employed in a forward converter and driven by the secondary power winding T1A. FIG. 5 is similar to FIG. 2, except that the drive circuit is coupled to the secondary power winding T1A instead of the secondary auxiliary winding T1B of FIG. 2. FIG. 6 is a schematic diagram of one embodiment of a synchronous rectifier drive circuit employed in a push-push converter and driven by a the secondary power winding T1A. FIG. 6 is similar to FIG. 3, except that the drive circuit is coupled to the secondary power winding T1A instead of the secondary auxiliary winding T1B of FIG. 3.

Figure 7:
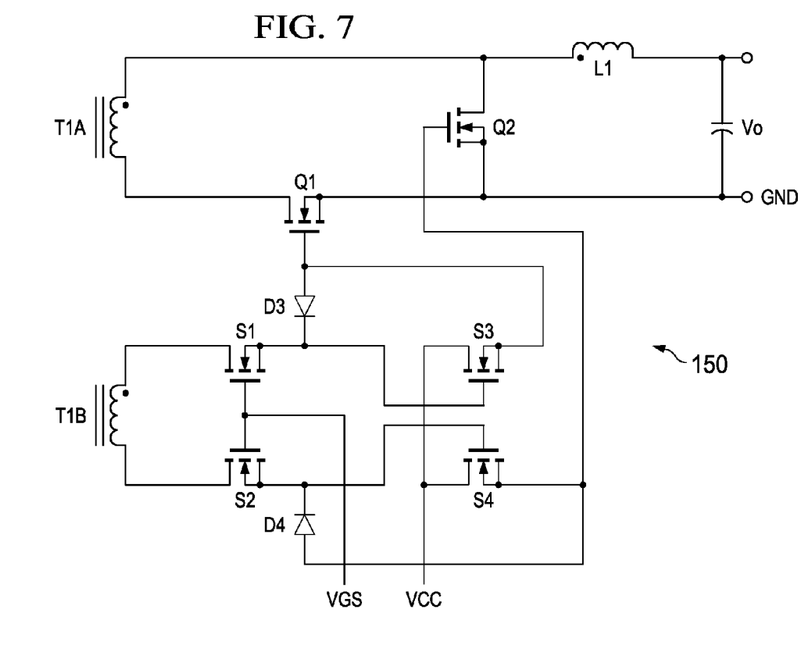
FIG. 7 is a schematic diagram of one embodiment of a synchronous rectifier drive circuit employed in a forward converter and in which gate discharge diodes thereof are in a first alternative configuration.
Figure 8:
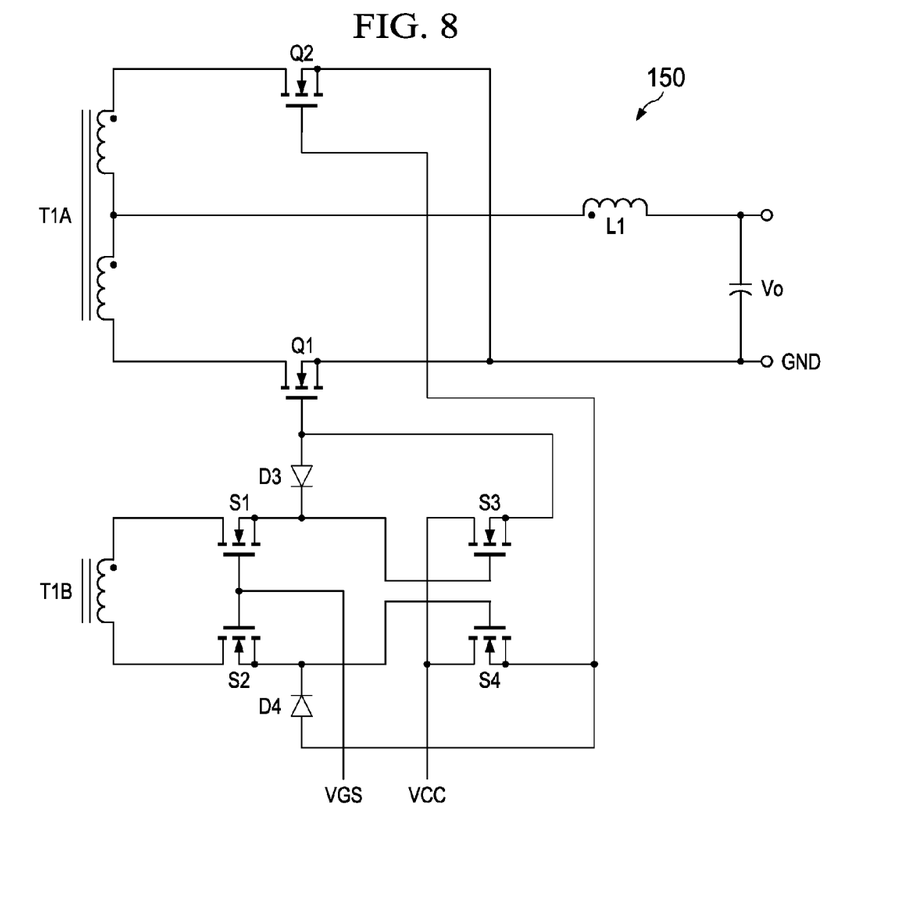
FIG. 8 is a schematic diagram of one embodiment of a synchronous rectifier drive circuit employed in a push-push converter and in which gate discharge diodes thereof are in a first alternative configuration.

The diodes D3, D4 can be connected in other ways. For example, the diode D3 can be made to cooperate with the body diode of the first drive circuit switch S1, and the diode D4 can be made to cooperate with the body diode of the first drive circuit switch S2. FIGS. 7 and 8 are schematic diagrams of one embodiment of a synchronous rectifier drive circuit respectively employed in a forward converter and a push-push converter and show this first alternative configuration. The power converters of FIGS. 7 and 8 are much the same as FIGS. 2 and 3, respectively, except that the diodes D3, D4 of the drive circuits thereof are coupled respectively to the drains of the first and third drive circuit switches S1, S3 instead of sources of the first and third drive circuit switches S1, S3.

Figure 9:
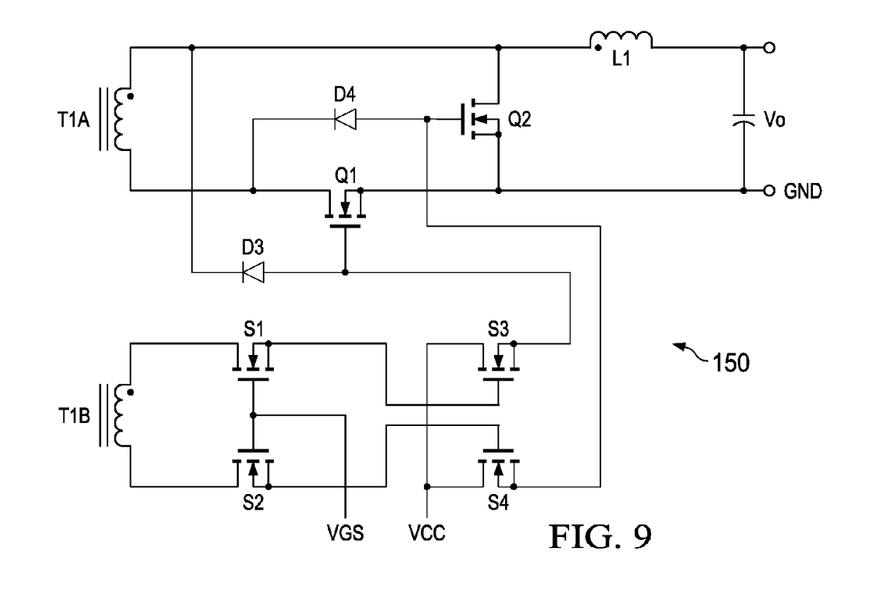
FIG. 9 is a schematic diagram of one embodiment of a synchronous rectifier drive circuit employed in a forward converter and in which gate discharge diodes thereof are in a second alternative configuration.
Figure 10:
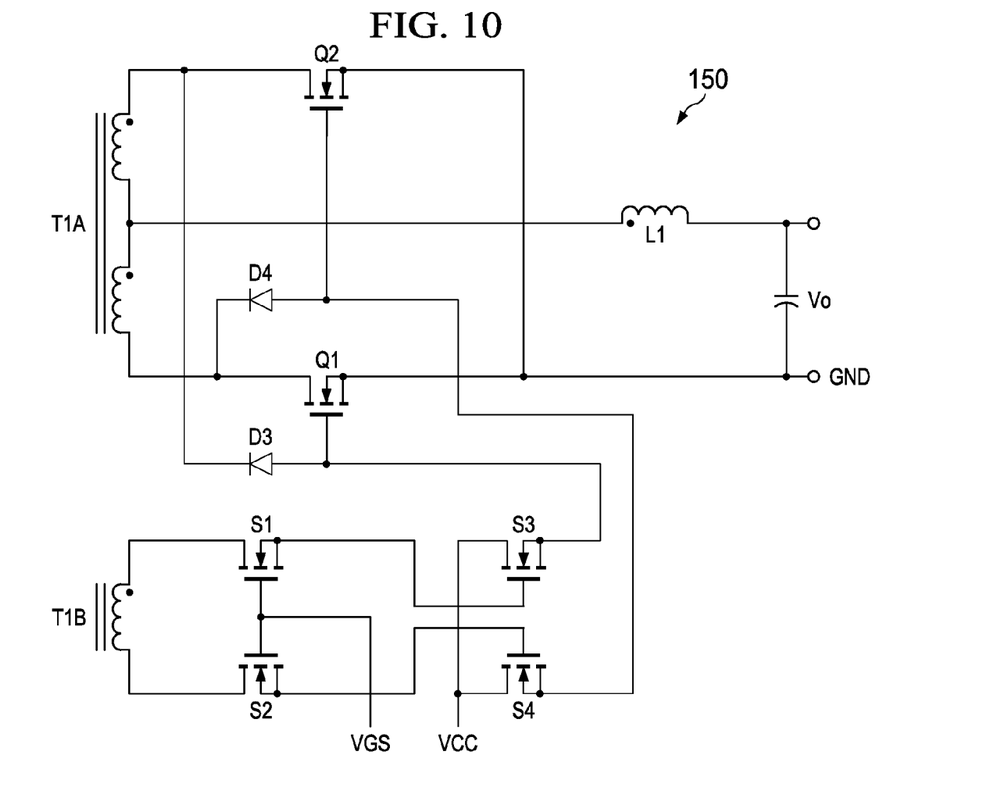
FIG. 10 is a schematic diagram of one embodiment of a synchronous rectifier drive circuit employed in a push-push converter and in which gate discharge diodes thereof are in a second alternative configuration.

FIGS. 9 and 10 show that the diodes D3, D4 can be connected in still other ways. FIGS. 9 and 10 are schematic diagrams of one embodiment of a synchronous rectifier drive circuit respectively employed in a forward converter and a push-push converter. power converters of FIGS. 9 and 10 are much the same as FIGS. 2 and 3, respectively, except that the diodes D3, D4 of the drive circuits thereof are coupled to the secondary power winding T1A instead of the secondary auxiliary winding T1B. In this second alternative configuration, the diodes D3, D4 may be expected to experience higher voltages, and concomitant voltage stress, due to their coupling to the secondary power winding T1A.

Figure 11:
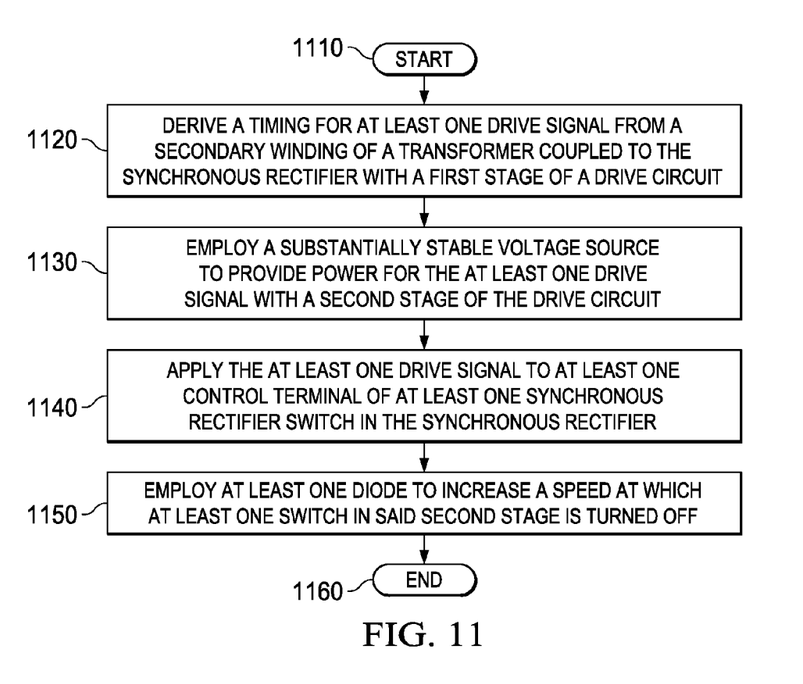
FIG. 11 is a flow diagram of one embodiment of a method of driving a synchronous rectifier.

FIG. 11 is a flow diagram of one embodiment of a method of driving a synchronous rectifier. The method begins in a start step 1110. In a step 1120, a first stage of a synchronous rectifier drive circuit derives a timing for at least one drive signal from a secondary winding of a transformer coupled to the synchronous rectifier. In a step 1130, a second stage of the drive circuit employs a substantially stable voltage source to provide power for the at least one drive signal. In a step 1140, the at least one drive signal is applied to at least one control terminal of at least one synchronous rectifier switch of the power converter. In a step 1150, at least one diode is employed to increase a speed at which at least one switch in said second stage is turned off. The method ends in an end step 1160.

Those skilled in the art to which this application relates will appreciate that other and further additions, deletions, substitutions and modifications may be made to the described embodiments.

What is claimed is:

1. A drive circuit for a synchronous rectifier, comprising:
a first drive circuit stage configured to derive a timing for at least one drive signal from a secondary winding of a transformer coupled to said synchronous rectifier, said first drive circuit stage comprising a first drive circuit switch having a control terminal coupled to an unstable voltage source; and
a second drive circuit stage comprising a second drive circuit switch having a control terminal coupled to and controlled by an output of said first drive circuit switch, said second drive circuit switch configured to employ a stable voltage source to provide power for said at least one drive signal and apply said at least one drive signal to at least one control terminal of at least one synchronous rectifier switch in said synchronous rectifier in accordance with the timing derived by said first drive circuit stage.

2. The drive circuit as recited in claim 1 further comprising at least one diode coupled to said second drive circuit stage and configured to increase a speed at which at least one switch in said second drive circuit stage is turned off.

3. The drive circuit as recited in claim 2 wherein said at least one diode is coupled to a secondary power winding of said transformer.

4. The drive circuit as recited in claim 1 wherein said secondary winding is a secondary auxiliary winding.

5. The drive circuit as recited in claim 1 wherein said synchronous rectifier is part of a power converter configured to accommodate a maximum input voltage that is more than about three times a minimum input voltage.

6. The drive circuit as recited in claim 1 wherein said stable voltage source is Vcc.

7. The drive circuit as recited in claim 1 wherein said synchronous rectifier is part of one of:
a forward converter, and
a push-push converter.

8. A method of driving a synchronous rectifier, comprising:
deriving a timing for at least one drive signal from a secondary winding of a transformer coupled to said synchronous rectifier with a first drive circuit stage, wherein the first drive circuit stage includes a first drive circuit switch having a control terminal coupled to an unstable voltage source;
employing a stable voltage source to provide power for said at least one drive signal with a second drive circuit stage that includes a second drive circuit switch having a control terminal coupled to and controlled by an output of the first drive circuit switch; and
applying said at least one drive signal to at least one control terminal of at least one synchronous rectifier switch in said synchronous rectifier in accordance with the timing derived by the first drive circuit stage.

9. The method as recited in claim 8 further comprising employing at least one diode coupled to said second drive circuit stage to increase a speed at which at least one switch in said second drive circuit stage is turned off.

10. The method as recited in claim 9 wherein said at least one diode is coupled to a secondary power winding of said transformer.

11. The method as recited in claim 8 wherein said secondary winding is a secondary auxiliary winding.

12. The method as recited in claim 8 wherein said synchronous rectifier is part of a power converter configured to accommodate a maximum input voltage that is more than about three times a minimum input voltage.

13. The method as recited in claim 8 wherein said stable voltage source is Vcc.

14. The method as recited in claim 8 wherein said synchronous rectifier is part of one of:
a forward converter, and
a push-push converter.

15. A power converter, comprising:
a primary side including at least one primary side switch and configured to accommodate a maximum input voltage that is more than about three times a minimum input voltage;

a secondary side including a synchronous rectifier having at least one synchronous rectifier switch;

a transformer core coupling said primary side and said secondary side; and a drive circuit for said synchronous rectifier, including:

a first drive circuit stage configured to derive a timing for at least one drive signal from a secondary winding of said transformer, said first drive circuit stage comprising a first drive circuit switch having a control terminal coupled to an unstable voltage source, and a second drive circuit stage comprising a second drive circuit switch having a control terminal coupled to and controlled by an output of said first drive circuit stage switch, said second drive circuit switch configured to employ a stable voltage source to provide power for said at least one drive signal and apply said at least one drive signal to at least one control terminal of said at least one synchronous rectifier switch in accordance with the timing derived by said first drive circuit stage.

16. The power converter as recited in claim 15 further comprising at least one diode coupled to said second drive circuit stage and configured to increase a speed at which at least one switch in said second drive circuit stage is turned off.

17. The power converter as recited in claim 16 wherein said at least one diode is coupled to a secondary power winding of said transformer.

18. The power converter as recited in claim 15 wherein said secondary winding is a secondary auxiliary winding.

19. The power converter as recited in claim 15 wherein said stable voltage source is Vcc.

20. The power converter as recited in claim 15 wherein said synchronous rectifier is part of one of:

a forward converter, and a push-push converter.

* * * * *

UNITED STATES PATENT AND TRADEMARK OFFICE
CERTIFICATE OF CORRECTION

| | | |
|---|---|---|
| PATENT NO. | : 9,106,129 B2 | Page 1 of 1 |
| APPLICATION NO. | : 13/404760 | |
| DATED | : August 11, 2015 | |
| INVENTOR(S) | : Yin et al. | |

It is certified that error appears in the above-identified patent and that said Letters Patent is hereby corrected as shown below:

Specification

In Column 1, Line 56, delete "stage" and insert -- stage, --, therefor.

Claims

In Column 9, Line 14, in Claim 15, delete "circuit stage" and insert -- circuit --, therefor.

Signed and Sealed this
Tenth Day of May, 2016

Michelle K. Lee
*Director of the United States Patent and Trademark Office*